(12) United States Patent
Dominguez et al.

(10) Patent No.: US 12,067,000 B2
(45) Date of Patent: Aug. 20, 2024

(54) METHODS AND SYSTEMS TO PROCESS ASYNCHRONOUS TRANSACTIONS AT A MANAGEMENT SYSTEM

(71) Applicant: T-Mobile Innovations LLC, Overland Park, KS (US)

(72) Inventors: Pablo Medeiros Dominguez, Redmond, WA (US); Mirmd Hasan, Bellevue, WA (US); James Latham, Redmond, WA (US); Joshua Ogden, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 89 days.

(21) Appl. No.: 17/825,919

(22) Filed: May 26, 2022

(65) Prior Publication Data
US 2023/0385272 A1 Nov. 30, 2023

(51) Int. Cl.
*G06F 16/23* (2019.01)
*G06Q 30/04* (2012.01)

(52) U.S. Cl.
CPC ......... *G06F 16/2379* (2019.01); *G06Q 30/04* (2013.01)

(58) Field of Classification Search
None
See application file for complete search history.

(56) References Cited

U.S. PATENT DOCUMENTS

| | | | |
|---|---|---|---|
| 2005/0074110 A1* | 4/2005 | Moreman ........... | H04M 3/4228 379/212.01 |
| 2005/0220287 A1* | 10/2005 | Aures .................. | H04Q 3/005 379/221.13 |
| 2010/0041365 A1* | 2/2010 | Lott ...................... | H04W 60/00 455/406 |
| 2011/0085653 A1* | 4/2011 | Bailey ............... | H04M 3/42161 379/201.12 |
| 2017/0150435 A1* | 5/2017 | Tagg ..................... | H04W 4/02 |
| 2020/0084615 A1* | 3/2020 | Viswanathan ......... | H04W 8/28 |
| 2020/0136930 A1* | 4/2020 | Szulman ............. | H04L 41/5096 |
| 2022/0360608 A1* | 11/2022 | Raleigh ............... | H04L 63/0428 |

* cited by examiner

*Primary Examiner* — Mark D Featherstone
*Assistant Examiner* — Kweku William Halm

(57) ABSTRACT

A method comprises receiving an add instruction to add a new account to a subscriber database at the system, wherein the add instruction indicates a line identifier and a first source identifier, wherein the line identifier identifies a line activated by the new account, wherein a first source identifier identifies a first carrier billing system from which the request to add the new account is received, when an existing account indexed by the line identifier is present at the subscriber database, deleting, by the provisioning application, the existing account from the subscriber database, and adding, by the provisioning application, the new account associated with the line identifier at the subscriber database, wherein the new account indicates the first source identifier.

18 Claims, 9 Drawing Sheets

METHODS AND SYSTEMS TO PROCESS ASYNCHRONOUS TRANSACTIONS AT A MANAGEMENT SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Companies with many subscribers often aggregate subscriber data into large back-end systems to support their products and service offerings. As companies grow, they may acquire customers through mergers, which may have additional brands and lines of business. Subscribers who may be customers from different brands or lines of business may need to be consolidated into common back end systems.

Consolidation of subscriber data from multiple sources can create provisioning problems in back end systems. Race conditions, for example, may occur where subscriber data is deleted and re-added by different provisioning systems. If these provisioning transactions are sent to back-end systems out of order, the back end may not be able to process them in the correct order, invalidating the resulting data.

Telecommunications consolidation, in particular, can suffer from this problem in which phone numbers and SIM card numbers, often used as identifiers for subscribers, are reused and ported between brands and lines of business. If subscriber data is incorrectly provisioned, the user may not be able to use services and products correctly.

For example, a parent telecommunications service provider or carrier may own multiple sub-carriers or brands, some of which may include, for example, pre-paid wireless service providers, post-paid wireless service providers, mobile virtual network operators, etc. In this case, each of the sub-carriers may access the same carrier network resources (including, for example, a radio access network (RAN) and a core network) owned and operated by the parent carrier. Each of the sub-carriers may also be associated with a different set of subscribers, each of which may be respectively registered with the sub-carrier. The sub-carriers are included under the umbrella of the parent carrier, and the parent carrier may be contracted to manage subscribers using a single Identity and Access Management (IAM) system.

In this case, an IAM system may include a set of servers designed to implement a platform to provide the processes, technologies, and policies for managing digital identities and controlling how those identities can be used to access carrier network resources. A subscriber may access the IAM system by logging into a carrier website, mobile application, or sub-carrier website, to manage a subscriber account or use supported applications and services. The IAM system authenticates the subscriber upon log-in using, for example, a username, password, biometric information, and/or one-time codes. The IAM system also provides the subscriber access to subscriber account information, such as, for example, contracts, phone numbers associated with each contract, rate plans, billing features, etc. The IAM system also provides access to digital services such as Internet of Things (IoT) device access, banking, telephony and messaging.

SUMMARY

In an embodiment, a method performed by a system comprising consolidated subscriber data in communication with a plurality of provisioning middlewares to provision transactions asynchronously. The method comprises receiving, by a provisioning application at the system from a first provisioning middleware, an add instruction to add a new account to a subscriber database at the system, wherein the add instruction indicates a line identifier and a first source identifier, wherein the line identifier identifies a line activated by the new account, wherein a first source identifier identifies a first carrier billing system from which the first provisioning middleware received a request to add the new account, and wherein the first provisioning middleware is communicatively coupled to the first carrier billing system, determining, by the provisioning application, an existing account indexed by the line identifier that is present at the subscriber database after receiving the add instruction, and when the existing account indexed by the line identifier is present at the subscriber database, deleting, by the provisioning application, the existing account from the subscriber database, and adding, by the provisioning application, the new account associated with the line identifier at the subscriber database, wherein the new account indicates the first source identifier.

In another embodiment, a method performed by a system to provision transactions asynchronously. The method comprises receiving, by a provisioning application at the system from a provisioning middleware, an add instruction to add a new account to a subscriber database at the system, wherein the add instruction comprises a line identifier and a first source identifier, wherein the line identifier identifies a line activated by the new account, and wherein the first source identifier identifies a first carrier billing system from which the provisioning middleware received a request to add the new account, after receiving the add instruction to add a new account to a subscriber database, receiving, by the provisioning application from the provisioning middleware, a delete instruction to delete an existing account from the subscriber database at the system, wherein the delete instruction comprises the line identifier and a second source identifier, and wherein the second source identifier identifies a second carrier billing system from which the provisioning middleware received a request to delete the existing account, adding, by the provisioning application, the new account associated with the line identifier to the subscriber database, wherein the new account is indexed by the line identifier and indicates the first source identifier, determining, by the provisioning application, the existing account at the subscriber database that is also indexed by the line identifier, wherein the existing account indicates an existing source identifier, determining, by the provisioning application, whether the second source identifier in the delete instruction matches the existing source identifier in the existing account, and deleting, by the provisioning application, the existing account from the subscriber database when the second source identifier in the delete instruction matches the existing source identifier in the existing account.

In yet another embodiment, a system comprising at least one processor, at least one non-transitory memory, one or more provisioning middlewares communicatively coupled to a first carrier billing system and a second carrier billing system, and a provisioning application of the system, stored in the at least one non-transitory memory is disclosed. The one or more provisioning middlewares are configured to transmit, to a system, an add instruction to add a new account to a subscriber database at the system, wherein the add instruction indicates a line identifier and a first source identifier, wherein the line identifier identifies a line activated by the new account, and wherein a first source identifier identifies a first carrier billing system, and transmit, to a system, a delete instruction to delete an existing account from the subscriber database at the system, wherein the delete instruction indicates the line identifier and a second source identifier, and wherein the second source identifier identifies a second carrier billing system. The provisioning application, when executed by the at least one processor, causes the at least one processor to be configured to receive the add request, receive the delete request after the add request is received, add the new account associated with the line identifier at the subscriber database with the first source identifier such that the new account is indexed by the line identifier, determine the existing account at the subscriber database that is also indexed by the line identifier, wherein the existing account indicates an existing source identifier, determine whether the second source identifier in the delete instruction matches the existing source identifier in the existing account, and delete the existing account from the subscriber database when the second source identifier in the delete instruction matches the existing source identifier in the existing account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
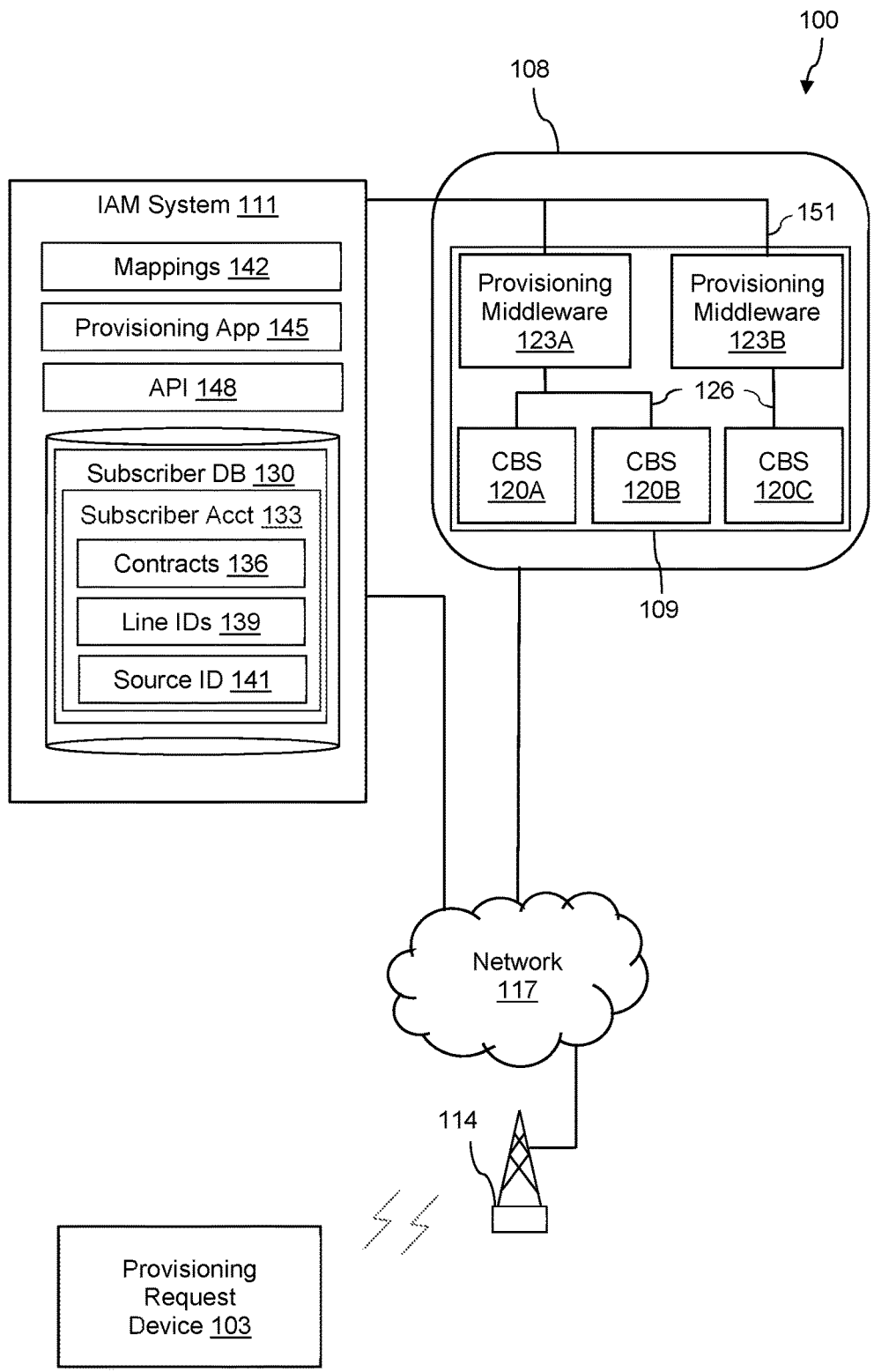
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a parent telecommunications carrier may own multiple sub-carriers or brands, some of which may include, for example, pre-paid wireless service providers, post-paid wireless service providers, mobile virtual network operators, etc. In some cases, each of the sub-carriers may share the same network resources belonging to the parent carrier network. The parent carrier network may be a network operated by the parent carrier company, and may include, for example, a RAN and a core network. Each of the sub-carriers may also include a different set of subscribers, and each subscriber may be registered with a separate sub-carrier billing system in a sub-carrier subscriber database.

The parent carrier may be contracted with a single IAM system, which is responsible for authenticating and managing subscriber accounts across all the sub-carriers. To this end, the IAM system may maintain a subscriber database with information describing each of the subscribers across all of the sub-carriers in individual subscriber accounts. For example, each subscriber account may include identification information of the subscriber (e.g., name, address, etc.), contracts with the carrier or sub-carrier, line identifiers associated with each contract, rate plans, etc. The IAM system may maintain different subscriber database or data stores for each sub-carrier, or the IAM system may maintain a single subscriber database or data store for the parent carrier, with different memory ranges allocated to each of the sub-carriers. For example, a line identifier may be Mobile Subscriber Integrated Services Digital Network (MSISDN) number uniquely identifying a subscription of the device, an International Mobile Subscriber Identity (IMSI) identifying a Subscriber Identity Module (SIM) card or profile of the device, or any other value uniquely assigned to a line or a device, which is to be registered or already registered with a sub-carrier or carrier network.

The core network of the carrier network may include a different carrier billing system (sometimes referred to herein as simply a "billing system") for each sub-carrier. The billing system for a particular sub-carrier may be responsible for implementing the processes for billing and invoicing subscribers of the sub-carrier. Each carrier billing system may include servers and databases storing information describing the subscriber and billing details for each subscriber. For example, the carrier billing system may include payment functions for automating the process of collecting payments, sending out recurring invoices, expense tracking, invoice tracking, etc.

In some cases, a carrier billing system may communicate with other entities in a network through a provisioning middleware at the core network. For example, a provisioning middleware may be a Home Subscriber Server (HSS), Home Location Register (HLR), or any other component of the core network. In some cases, a single provisioning middleware may be coupled to and responsible for forwarding communications to and from multiple carrier billing systems. In other cases, a single provisioning middleware may be coupled to and responsible for forwarding communications to and from only one carrier billing system. In addition, each carrier billing system in the core network may operate completely independently, in the sense that the carrier billing systems do not coordinate or communicate with each other when processing transactions. This may result in the IAM system receiving transactions in an incorrect order, which may cause other technical issues at the core network and IAM system.

For example, a single subscriber account may include one or more lines, each associated with a different line identifier (e.g., MSISDN) and potentially a different contract. The term "account" as used herein may refer to an entire subscriber account or a line in a subscriber account indexed by a line identifier. A subscriber of a first sub-carrier may enter a retail store of the parent carrier, asking to transfer service of a line (e.g., phone number, line of service, device, etc.) from a first sub-carrier to a second sub-carrier (both owned by the same parent carrier). Alternatively, a subscriber of a first sub-carrier may manually request the transfer of service from the first sub-carrier to the second sub-carrier by cancelling an account at the first sub-carrier and adding a new account at the second sub-carrier. In either case, the transfer of service at the IAM system may include two provisioning transactions: (1) the deletion of a line at the first sub-carrier; and (2) the addition of a line at the second sub-carrier. A provisioning request device, which may be a subscriber device or a retail store device, may transfer the two requests respectively corresponding to the foregoing two provisioning transactions. For example, the provisioning request device transmits the request to delete the account linked to a carrier billing system of the first sub-carrier, and transmits the request to add the account linked to a carrier billing system of the second sub-carrier, and each request may include the line identifier of the line.

The carrier billing systems of the first sub-carrier and second sub-carrier separately receive these provisioning requests, and process these requests entirely independently, without considering the request received at the other carrier billing system. For example, the carrier billing system of the second sub-carrier may process the request first, by adding information regarding the added device to the carrier billing system, and forwarding the request to a provisioning middleware. The provisioning middleware may forward, to the IAM system, the request and other information used to add the account to, for example, subscriber data associated with the second sub-carrier.

At this stage, the IAM system has received the request to add the account at the second sub-carrier with the line identifier, before receiving the request to delete the account at the first sub-carrier with the same line identifier. The IAM system may be configured to reject this request to add the account because the IAM system may already recognize that the line identifier of the device being added is already indicated in the subscriber database at the IAM system. In other words, the IAM system may see the request to add the account as redundant or illegitimate due to the line identifier already being stored at the subscriber database, and deny the request.

Subsequently, the carrier billing system of the first sub-carrier may transmit, via a provisioning middleware to the IAM system, the request to delete the account linked to the device from the subscriber database at the IAM system. The IAM system may process this request to delete the account linked to the device, which results in the IAM system entirely cancelling the account linked to the device. After which, the owner of the device may not be able to use the IAM system to access an account linked to the line.

Therefore, the lack of synchronization between carrier billing systems while communicating with the IAM system results delayed in communications with the IAM system. The delay in communications may result in transactions being received at the IAM system in an incorrect order which, as described above, may result in the cancellation of the account associated with the device at the IAM system. The delays may also result in the cancellation of network services for the device when the network provisioning uses a similar architecture and process for provisioning subscriber data. In some cases, error handling may continuously try to re-send transactions to the carrier billing systems and the IAM system, when the transaction fails. This may cause additional technical problems, such as, for example, overloading transaction queues at the systems, causing some transactions to be lost completely, while significantly increasing the load on the network. Additional complications, such as redundant charges to the subscriber, may also arise in the case when transactions are re-sent due to initial failure.

Disclosed herein are embodiments directed to enhancing communications between the carrier billing systems and the IAM system, to prevent failure at the IAM system due to receiving provisioning transactions at the IAM system in an incorrect order. In some embodiments, a provisioning application at the IAM system may add an account linked to an identifier of the line to the subscriber database when a request to add the account is received, regardless of whether the line identifier is already present at the subscriber database. In the case when the line identifier is already present at the subscriber database, the provisioning application may automatically delete the existing account indexed by the line identifier, after receiving the request to add the account and without receiving a request to delete the account.

In an embodiment, a first carrier billing system may receive a request to add an account associated with a line identifier of a device, while a second carrier billing system receives a request to delete the account associated with the line identifier. The first carrier billing system may add the account into the billing system, and then forward a request to the provisioning middleware associated with the first carrier billing system. This request may include a source identifier of the first carrier billing system, which may be used to identify the source billing system of the request. The provisioning middleware may gather information related to the request, and generate an add instruction to add the account including the information and the source identifier of the first carrier billing system. The provisioning middleware may transmit the add instruction to the IAM system.

A provisioning application at the IAM system may receive the add instruction and add the account associated with the line identifier to the subscriber database at the IAM system. In an embodiment, the provisioning application may additionally store the source identifier of the first carrier billing system with the newly added account, in which the source identifier indicates the source of the newly added account. In another embodiment in which different data stores or portions of the subscriber database store information for subscribers of different sub-carriers, the provisioning application may ensure that the newly added account is stored in the data store or in the portion of the subscriber database dedicated to the first carrier and/or the first carrier billing system.

In an embodiment, the provisioning application may also search the subscriber database to determine whether the line identifier is already indicated with an existing subscriber account in the subscriber database. If so, the provisioning application may automatically delete the existing account before completing the request to add the subscriber data. In this case, since the billing system holds the master copy of the data, the provisioning application may be configured to prioritize the new request to add data over the data already in the database. The newly added subscriber data may include the source identifier of the first carrier billing system. The provisioning application may also send a response to the provisioning request to indicate success.

After receiving the request to delete, the second carrier billing system may delete the account associated with the line identifier from the billing system, and then forward the request to the provisioning middleware associated with the second carrier billing system. This request may include a source identifier of the second carrier billing system, which may be used to identify the source of the data. The provisioning middleware may gather information related to the request to delete, and generate a delete instruction to delete the account including the information and the source identifier of the second carrier billing system. The provisioning middleware may transmit the delete instruction to the IAM system.

At this stage, the IAM system may search the subscriber database and, using the source identifier stored in the IAM subscriber database, recognize that the line identifier stored at the subscriber database is associated with a source identifier of the first carrier billing system, since this account was recently added. Meanwhile, the delete instruction includes a source identifier of the second carrier billing system. In this case, the source identifier received in the delete instruction is different from the source identifier stored with the line identifier at the subscriber database of the IAM system. The provisioning application may recognize that the delete instruction may be ignored due to the mismatch of source identifiers, and ensure that the delete transaction does not delete data from the database. Nevertheless, the provisioning application may still transmit a response with an acknowledgment back to the carrier billing systems and/or the provisioning request device indicating success. In other words, the provisioning application may still transmit an acknowledgement that both transactions from the first and second billing systems were successful, even though the transaction requests or instructions were received out of order.

Subsequently, the provisioning request device 103 may transmit a request to update a subscriber account at the IAM system 110 through the first carrier billing system. The first carrier billing system may be updated locally, and then the first carrier billing system may forward the request to update including details regarding the update to the provisioning middleware. In an embodiment, the request to update also includes a source identifier of the first carrier billing system. The provisioning middleware may generate an update instruction including the source identifier of the first carrier billing system, and send the update instruction to the IAM system.

The provisioning application at the IAM system may search the subscriber database and recognize that the line identifier stored at the subscriber database is associated with a source identifier of the first carrier billing system, since this account was recently added. Meanwhile, the update instruction also includes a source identifier of the first carrier billing system. In this case, the source identifier received in the instruction is the same as the source identifier stored with the line identifier at the subscriber database of the IAM system. The provisioning application may recognize that the source identifiers match, and permit processing the update of the subscriber account at the subscriber database of the IAM system based on the update instruction.

In another case, the source identifier received in the instruction may not match the source identifier stored with the line identifier at the subscriber database of the IAM system. In this case, the provisioning application may not the update in the IAM subscriber database since the initial request to update was received from an incorrect source carrier billing system, as indicated by the source identifier in the update instruction. Nevertheless, the provisioning application may still transmit a response including an acknowledgment that the update was successful, even though the update may not have been actually performed.

As described, the embodiments disclosed herein provide a technical solution to the foregoing technical problem, by configuring the IAM system to process requests to transfer accounts between sub-carriers or brands regardless of the order of the received requests. This prevents the IAM system from inadvertently cancelling an account related to a device that should still be activated at the IAM. Further, by sending an acknowledgment indicating success of transfer or update, regardless of whether the transfer or update was performed, the provisioning requests are prevented from being repeatedly re-sent. Failure alarms are also prevented from unnecessarily consuming computing resources at the systems. Thus, the acknowledgements may provide a technical solution to the foregoing technical problem by reducing the queries to the IAM system and/or carrier billing systems, while also significantly reducing the load on network resources at the carrier network (i.e., to increase bandwidth and capacity at the carrier network).

Turning now to FIG. 1, a communication system 100 is described. The system 100 comprises a provisioning request device 103, a carrier network 108, an IAM system 111, a cell site 114, and a network 117. The provisioning request device 103 may be communicatively coupled to the carrier network 108, network 117, and/or the IAM system 111 via the cell site 114.

The provisioning request device 103 may be a cell phone, a mobile phone, a smart phone, a personal digital assistant (PDA), an Internet of things (IoT) device, a wearable computer, a headset computer, a laptop computer, a tablet computer, or a notebook computer. As mentioned above, the provisioning request device 103 may be a subscriber device, a device at a retail store of a carrier, or any other device capable of transmitting requests to add/delete/transfer accounts between carriers. The cell site 114 provides the provisioning request device 103 a wireless communication link to the carrier network 108, network 117, and/or the IAM system 111 according to a 5G, a long term evolution (LTE), a code division multiple access (CDMA), or a global system for mobile communications (GSM) wireless telecommunication protocol. The cell site 114 also provides the IAM system 111 a wireless communication link to the carrier network 108, network 117, and/or the provisioning request device 103 according to a 5G, a LTE, a CDMA, or a GSM wireless telecommunication protocol.

The network 117 may be one or more private networks, one or more public networks, the Internet, or a combination thereof. While FIG. 1 shows the carrier network 108 as being separate from the network 117, it should be appreciated that, in some embodiments, at least a portion of the carrier network 108 may be part of the network 117. The carrier network 108 may be a network including a RAN and a core network 109. The RAN may include the access network containing the radio elements of a cell network, and the core network 109 may include the elements that manage the subscriber information, call setup and routing, and related system supports. In an embodiment, the core network 109 may be an evolved packet core (EPC) core network. The core network 109 may be configured to implement a 5G, a LTE, a CDMA, or a GSM wireless telecommunication protocol. In one embodiment, the core network 109 may be a 3rd Generation Partnership Project (3GPP) Evolved Packet System (EPS).

As shown in FIG. 1, the core network 109 includes the carrier billing system 120A-C (shown in FIG. 1 as "CBS 120A-C") and provisioning middleware 123A-B, among other components of the core network 109 not otherwise shown in FIG. 1 or described herein. In an embodiment, carrier billing systems 120A-C are each respectively associated with a different sub-carrier (also referred to hereinafter as "carrier"), all of which are owned and operated by the same parent carrier company. For example, the carrier billing system 120A is associated with a first carrier A, the carrier billing system 120B is associated with a second carrier B, and the carrier billing system 120C is associated with a third carrier C. Each carrier billing system 120A-C may include servers and databases storing information describing the subscriber and billing details for each subscriber. The carrier billing system 120A-C for a particular carrier may be responsible for implementing the processes for billing and invoicing customers or subscribers of the carrier.

Provisioning middleware 123A-B are intermediate entities in the core network 109 through which different components of the core network 109 may communicate. The provisioning middleware 123A-B may convert information received from, for example, the carrier billing systems 120A-C, determine the elements in the network to which to forward the information, and transmit the information over various interfaces in the correct format to the respective elements in the network. In an embodiment, the provisioning middleware 123A-B may be an HSS, an HLR, or any other component of the core network 109. Each provisioning middleware 123A-B may be responsible for forwarding communication to and from one or more carrier billing systems 120A-B. As shown in FIG. 1, provisioning middleware 123A is communicatively coupled to both the carrier billing systems 120A and 120B, while the provisioning middleware 123B is communicatively coupled to only the carrier billing system 120C. In an embodiment, the carrier billing systems 120A-C may communicate with the provisioning middlewares 123A-B over an interface 126, which may be a wired or wireless link or interface.

The IAM system 111 may be a system of servers implementing a framework of policies and technologies to ensure that the subscribers of the carrier have the appropriate access to technology resources in the carrier network 108. Subscribers may access and manage subscriber accounts 133 at the subscriber database 130 through the IAM system 111. For example, a subscriber may access the subscriber account 133 using a carrier website, which communicates with the IAM system 111, to make, view, and update the subscriber account 133. For example, the subscriber may transfer services of a device, add a new line and corresponding device to a family plan, remove a line from a family plan, purchase a device, pay a bill, change a payment type or method, edit subscriber information, etc., through the IAM system 111.

The IAM system 111 may maintain a subscriber database 130 storing multiple subscriber accounts 133, which are accounts including information of subscribers registered with the carrier of the carrier network 108. The subscriber accounts 133 may each indicate information regarding lines registered with the carrier, such as, line identifiers 139, contracts 136 associated with each line, information regarding voice and data plans subscribed to by the subscriber, etc. The line identifier 139 may be an MSISDN, an IMSI, and/or any other value identifying the line. The contracts 136 represent one or more agreements between the subscriber and a carrier, regarding one or more devices. Each device registered with the subscriber account 133 may be considered a "line" of the subscriber account. In an embodiment, each subscriber MSISDN in the subscriber account 133, may also be associated with a source identifier 141. The source identifier 141 may identify a carrier billing system 120A-B, and consequently, a carrier/sub-carrier to which the subscriber account 133 or line is linked, as further described herein. The source identifier 141 may be a unique value (e.g., alphanumeric) identifying a carrier billing system 120A-B.

The subscriber accounts 133 may also be associated with credentials, such as a username and password, created by the subscriber upon creating the subscriber account, and other authentication information, such as biometrics and one-time passwords. The subscriber accounts 133 may also include identification information describing the subscriber, such as, for example, a name, address of the subscriber, account number of the subscriber, etc.

As mentioned above, when a carrier includes multiple sub-carriers and is contracted with a single IAM system 111, the subscriber database 130 may store the subscriber data of all the subscribers across all of the sub-carriers. While FIG. 1 shows only one subscriber database 130, in another embodiment, the IAM system 111 may maintain different subscriber databases 130, or data stores, for subscribers of each of the different sub-carriers. In another embodiment, the subscriber database 130 may associate certain memory ranges for different sub-carriers, and the subscriber data for each of the sub-carriers may be stored in the memory ranges accordingly. The subscriber database 130 for the parent carrier may only include a single instance of the line identifier 139, such that if multiple instances of the line identifier 139 are found, the IAM system 111 may determine that an error has occurred.

The IAM system 111 also includes the provisioning application 145. The provisioning application 145 may add, delete, and update subscriber accounts 133, or lines within the subscriber account 133, according to communications received from the provisioning middlewares 123A-B, as further described herein. The provisioning application 145 in the IAM system 111 may be communicatively coupled to the provisioning middlewares 123A-B at the core network 109 via links 151, which may be a wired or wireless link. While the links 151 are depicted in FIG. 1 as passing directly between the IAM system 111 and the carrier network 108, it should be understood that the links 151 may pass via the network 117. Alternatively, the provisioning application 145 and the provisioning middlewares 123A-B may communicate with one another using one or more APIs 148. The IAM system 111 may include the APIs 148, which are interfaces used to communicate with one or more entities in the system 100, such as, for example, the provisioning middlewares 123A-B or the carrier billing systems 120A-C. In some embodiments, the IAM system 111 may not include the provisioning middlewares 123A-B, and instead the carrier billing systems 120A-C may directly couple and communicate with the IAM system 111.

In an embodiment, the IAM system 111 may also store mappings 142, which may include a list of associations between source identifiers 141 of carrier billing systems 120A-C and the identifiers or address of the attached provisioning middlewares 123A-B. For example, the mappings 142 may indicate that the carrier billing systems 120A and 120B communicate through the provisioning middleware 123A, while the carrier billing system 120C communicates through the provisioning middleware 123B.

Figure 2A:
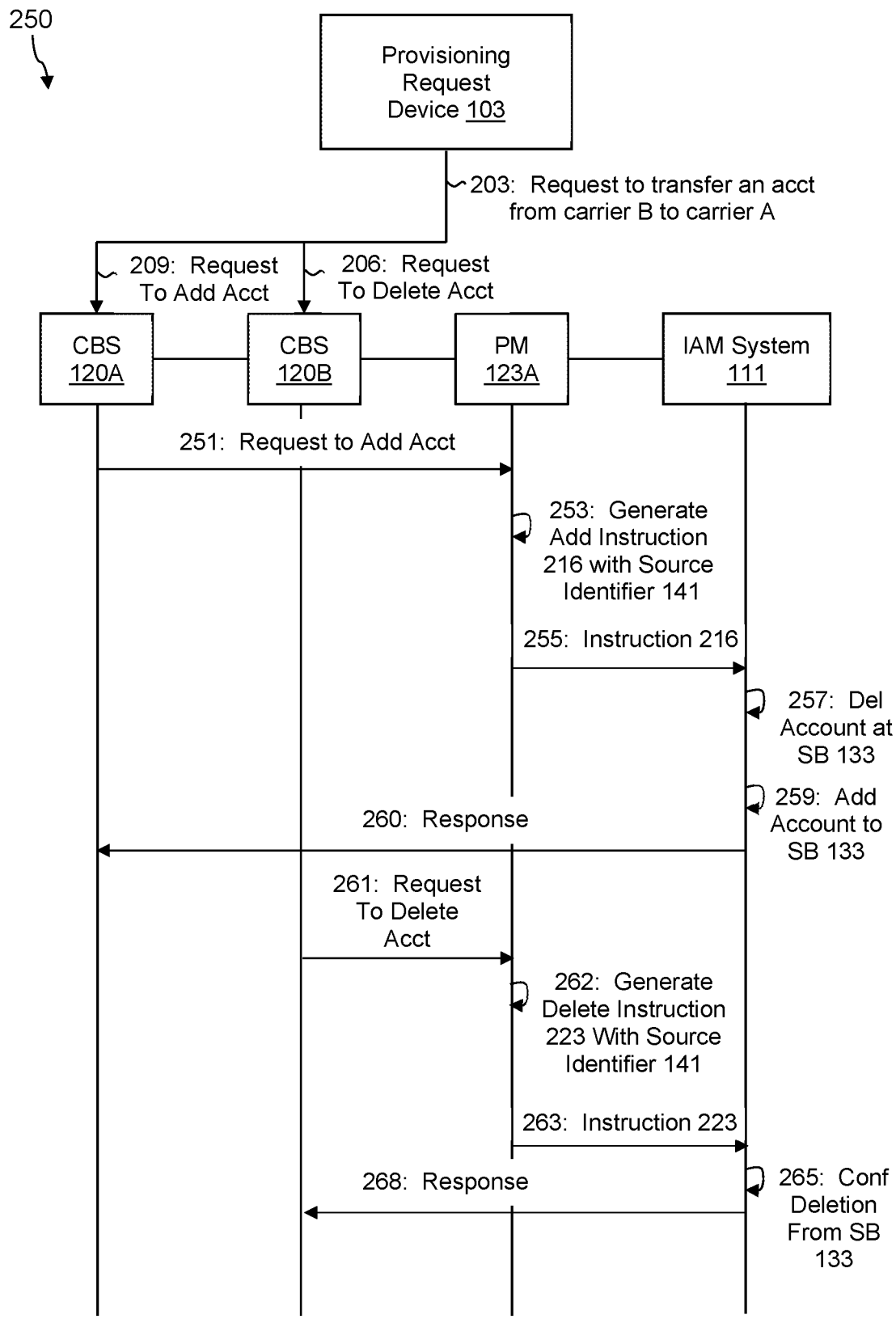
FIGS. 2A-B are message sequence diagrams of different example methods performed by the communication system of FIG. 1 according to an embodiment of the disclosure.
Figure 2B:
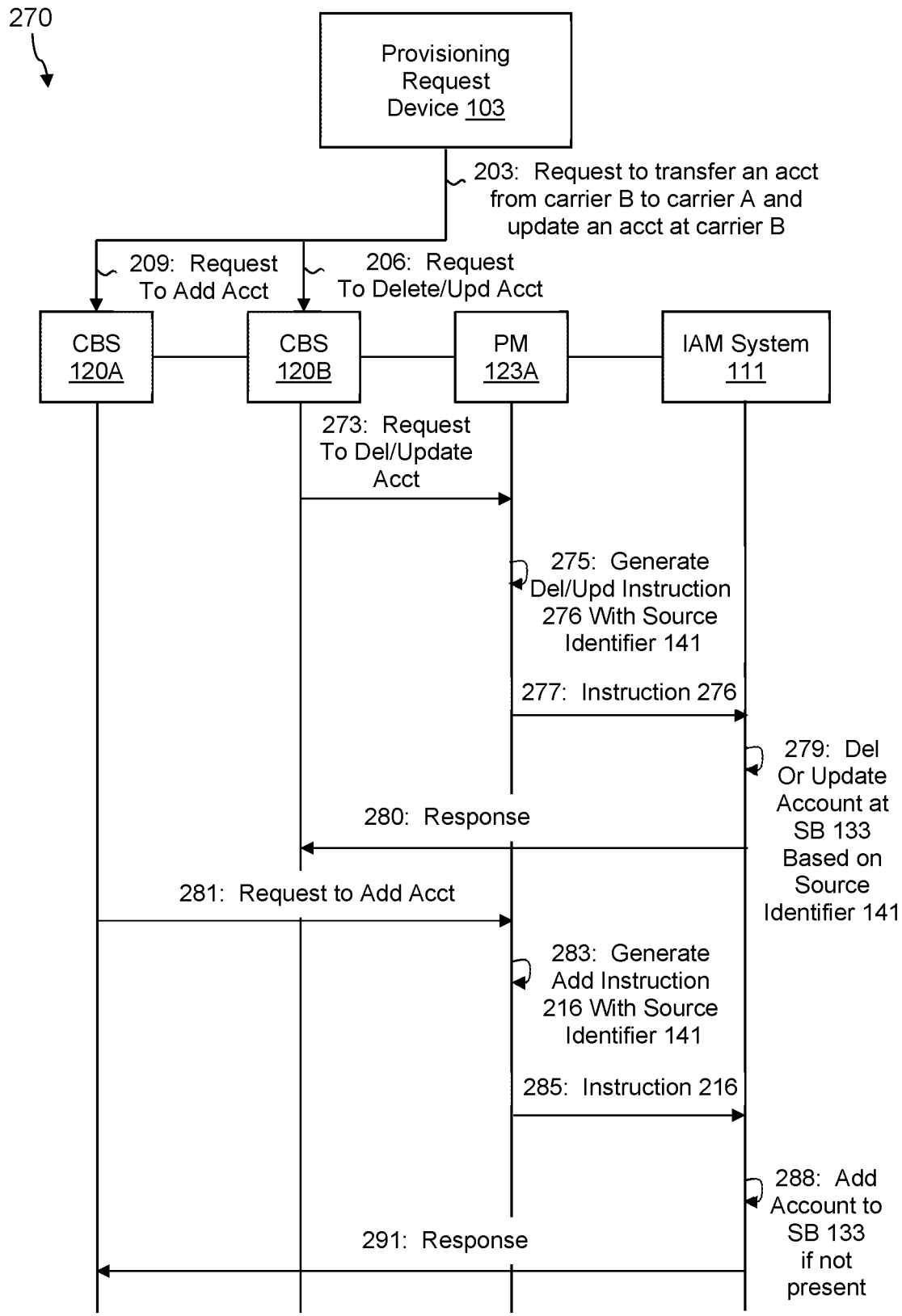

Turning now to FIGS. 2A-B, shown are message sequence diagrams 250 and 275 illustrating different examples of messages sent between the provisioning request device 103, carrier billing systems 120A-B, provisioning middleware 123A, and IAM system 111 according to various embodiments of the disclosure.

Referring now to FIG. 2A, shown is a message sequence diagram 250 illustrating an example case in which the IAM system 111 may delete the existing account linked to a line identifier 139, before a delete instruction 233 is received. At step 203, the provisioning request device 103 transmits a request to transfer an account associated with a device of a subscriber having a line identifier 139 from a carrier B to a carrier A. In other words, the subscriber may presently be a subscriber of carrier B, but may desire to change service providers to carrier A. Carrier B may own and operate the carrier billing system 120B, while carrier A may own and operate the carrier billing system 120A. The subscriber account 113 may already be provisioned in the IAM system 111.

The request to transfer the account may be split into two requests: a request to add a new account at carrier A and a request to delete an existing account from carrier B. At step 206, the request to delete an existing account from carrier B may be sent to the carrier billing system 120B. The request to delete the existing account may include information regarding the subscriber, the existing subscriber account 133, the line identifier 139, an existing contract 136 linked to the line identifier 139 that is to be cancelled, and/or any other information used to delete the existing account from carrier B. Upon receiving the request to delete the existing account, the carrier billing system 120B may process the request to delete the existing account locally at the carrier billing system 120B based on the data in the request.

At step 209, the request to add a new account at carrier A may be sent to the carrier billing system 120A. The request to add a new account may include information regarding the subscriber, an existing subscriber account 133 if applicable, the line identifier 139, a new contract 136 linked to the line identifier 139, a rate plan, billing details, and/or any other information used to add the new account to carrier A. Upon receiving the request to add the new account, the carrier billing system 120A may process the request to add the new account locally at the carrier billing system 120A based on the data in the request.

The two carrier billing systems 120A-B operate completely independently and do not coordinate the sequence or timing of processing the requests, and as such, the carrier billing systems 120A-B may forward the requests to the provisioning middleware 123A at arbitrary times relative to one another. The provisioning middleware 123A may by a transactional system that does not coordinate multiple transactions for the same subscriber account. The provisioning middleware 123A process transactions in the order they are received from each carrier billing system 120A-B, but may not synchronize transactions from different carrier billing system 120A-B. In an embodiment, the provisioning middleware 123A may be a cluster of worker processes that work independently at their own rate. In the example shown in FIG. 2A, the carrier billing system 120A forwards the request to add the new account before the carrier billing system 120B forwards the request to delete the existing account.

At step 251, the carrier billing system 120A forwards the request to add the new account, in some cases with additional information, to the provisioning middleware 123A associated with the carrier billing system 120A. In an embodiment, the forwarded request additionally includes a source identifier 141 identifying the source of the received request to add the new line (i.e., the carrier billing system 120A). The source identifier 141, and other information, may be included as a parameter in this request, to identify the source of the transaction in the request.

At step 253 the provisioning middleware 123A may then use the data in the request to generate an add instruction 216. The add instruction 216 may include subscriber and device information, which may be used to add the account as a new subscriber account 133 or a new line of an existing subscriber account 133 at the subscriber database 130 of the IAM system 111. For example, the add instruction 216 may include subscriber information such as name, address, account number, billing details, etc. In an embodiment, the add instruction 216 may also include the line identifier 139 of the device being transferred to carrier A. In an embodiment, the add instruction 216 may also include a new contract 136, which may be an agreement between the subscriber and the carrier A behind the carrier billing system 120A, with regard to the line identified by the line identifier 139.

In an embodiment, the provisioning middleware 123A may also add the source identifier 141 to the add instruction 216. The source identifier 141 again identifies the source billing system from which the original request was received, and in this case, the source identifier 141 identifies the carrier billing system 120A associated with carrier A. After generating the add instruction 216, the provisioning middleware 123A may transmit the add instruction 216 to the IAM system 111 via link 151, at step 255.

At step 257, after receiving the add instruction 216, the provisioning application 145 at the IAM system 111 determines that the line identifier 139 already exists in the database 130 and that source identifier 141 stored in association with the line identifier 139 at the subscriber database 130 indicates billing system 120B. Meanwhile, the source identifier in the add instruction 216 indicates billing system 120A. Therefore, the source identifier 141 stored in association with the line identifier 139 at the IAM system 111 does not match the source identifier 141 included in the add instruction 216, and since the add instruction 216 is an instruction to add data, the IAM system 111 prioritizes the add instruction 216 above the existing data stored at the subscriber database 130.

In some embodiments, the provisioning application 145 may automatically begin to delete an existing account linked to the line identifier 139 of the account that will be added at step 259 only based on the add instruction 216 (i.e., not based on receiving any instruction to delete an existing account). That is, the provisioning application 145 is programmed to automatically search for and delete accounts linked to a line identifier 139 upon receiving a corresponding add instruction 216.

At step 259, the provisioning application 145 begins the transaction to add the new account to the subscriber database 130. The provisioning application 145 may add a new subscriber account 133 with the data included in the add instruction 216, in which the line identifier 139 is linked to a line in the newly added subscriber account 133. The provisioning application 145 may also add a new line, linked to the line identifier 139, in an existing subscriber account 133. In an embodiment, the provisioning application 145 may also store the source identifier 141 of the carrier billing system 120A in the subscriber account 133, to which the line identifier 139 has been newly added.

At step 260, the provisioning application 145 may transmit a response to the carrier billing system 120A, or to the provisioning request device 103, with an acknowledgement indicating that the account was successfully added to the subscriber database 130 at the IAM system 111.

Subsequent to step 259, the carrier billing system 120B may forward the request to delete the existing account from carrier B to the provisioning middleware 123A associated with the carrier billing system 120B, at step 261. In an embodiment, the forwarded request may include the source identifier 141 of the carrier billing system 120B.

At step 262, the provisioning middleware 123A may use the data received in the request to delete the existing account to generate the delete instruction 223. The delete instruction 223 may include subscriber and device information, which may be used to delete the existing account from an existing subscriber account 133 or a line at the subscriber database 130 of the IAM system 111. For example, the delete instruction 223 may include subscriber information such as name, address, account number, billing details, etc. The delete instruction 223 may also include the line identifier 139 of the device being removed from carrier B.

In an embodiment, the provisioning middleware 123A may also add the source identifier 141 to the delete instruction 223. The source identifier 141 again identifies the carrier billing system 120B associated with carrier B. After generating the delete instruction 223, the provisioning middleware 123A may transmit the delete instruction 223 to the IAM system 111 via link 151, at step 263.

At step 265, the provisioning application 145 may search the subscriber database for the line identifier 139, and determine that the line identifier 139 is stored in association with the source identifier 141 identifying the carrier billing system 120A. However, the delete instruction 223 includes the source identifier 141 of the carrier billing system 120B. Therefore, the source identifier 141 stored with the line identifier 139 at the subscriber database 130 does not match the source identifier 141 included in the delete instruction 223. Since these source identifiers do not match and since the delete instruction 223 is an instruction to delete data, the IAM system 111 prioritizes the existing data above the delete instruction 223. In this case, the provisioning application 145 may determine that the line identifier 139 has already been re-associated with another source carrier billing system 120A, at step 257, and confirm that the previous account associated with the line identifier 139 has already been deleted. The provisioning application 145 may drop or discard the delete instruction 233, but still transmit a response to the carrier billing system 120B, or the provisioning request device 103, with an acknowledgement at step 268, indicating that the success of the transferring service of the device from carrier B to carrier A at the IAM system 111. In an embodiment, the IAM system may use the API 148 to communicate with the provisioning request device 103, to transmit the acknowledgment.

Referring now to FIG. 2B, shown is a message sequence diagram 270 illustrating an example case in which a request to delete or update an account is received at the IAM system 111 before the IAM system 111 receives a request to add the account in association with a different carrier.

Message sequence diagram 250 includes steps 203, 206, and 209, which are similar to the steps 203, 206, and 209 of message sequence diagram 250 of FIG. 2A. However, unlike message sequence diagram 250, the request at step 203 in message sequence diagram 270 may additionally include a request to update an account at carrier B. In this way, the request to delete that is sent at step 209 may also include a request to update an account at carrier B. For example, the request to update the account may include a request to change billing information to a cancelled state or a request to change a rate plan associated with the account.

The carrier billing system 120B may first process the request to delete and/or update the account locally at the carrier billing system 120B based on the data in the request. At step 273, the carrier billing system 120B forwards the request to delete and/or update the account, in some cases with additional information, to the provisioning middleware 123A associated with the carrier billing system 120B. The request may include the line identifier 139 of the device that is to be deleted from the account, the line identifier 139 or account number linked to the subscriber account 133 to be updated, and/or other subscription information. In an embodiment, the request may also include a source identifier 141 identifying the carrier billing system 120B.

At step 275, the provisioning middleware 123A may use the data in the request to delete and/or update the account to generate a delete and/or update instruction 276. The delete and/or update instruction 276 may include subscriber and device information, which may be used to delete and/or update the account in a subscriber account 133 at the subscriber database 130 of the IAM system 111. In an embodiment, the provisioning middleware 123A may also add the source identifier 141 identifying the carrier billing system 120B to the delete and/or update instruction 276. After generating the delete and/or update instruction 276, the provisioning middleware 123A may transmit the delete and/or update instruction 276 to the IAM system 111 via link 151, at step 277.

At step 279, the provisioning application 145 at the IAM system 111 may search for the subscriber account 133 in the subscriber database 130 using the line identifier 139 indicated in the delete and/or update instruction 276. The provisioning application 145 may then determine the source identifier 141 stored with the line identifier 139 at the subscriber database 130. The provisioning application 145 may compare the source identifier 141 at the subscriber database 130 with the source identifier 141 identifying the carrier billing system 120B in the delete and/or update instruction 276. When the source identifier 141 at the subscriber database 130 matches the source identifier 141 identifying the carrier billing system 120B in the delete and/or update instruction 276, the provisioning application 145 may successfully process the transaction to delete the account or update the account at the subscriber database 130. When the source identifier 141 at the subscriber database 130 fails to match the source identifier 141 identifying the carrier billing system 120B in the delete and/or update instruction 276, the provisioning application 141 may drop or discard delete and/or update instruction 276. In this case, the provisioning application 145 may not perform the transaction to delete the account or update the account at the subscriber database 130.

At step 280, the provisioning application 145 transmits, to carrier billing system 120B or the provisioning request device 103, a response including an acknowledgement indicating the success of the deleting or updating service performed at step 279.

At any point after step 273 is performed, the carrier billing system 120A may transmit a request to add a new account to the provisioning middleware 123A, at step 281. Step 281 may be similar to step 251 of the messaging sequence diagram 250. At step 283, the provisioning middleware 123A may then use the data in the request to generate an add instruction 216, similar to step 253 of the messaging sequence diagram 250. At step 285, the provisioning middleware 123A may transmit the add instruction 216 to the IAM system 111 via link 151.

At step 288, the provisioning application 145 at the IAM system may add the new account to the subscriber database 130, if the account is not already present in the subscriber database 130. If the account (e.g., the line identifier 139) is already present in the subscriber database 130, the provisioning application 145 may delete the already present account, using the techniques described herein.

At step 291, the provisioning application 145 transmits, to the carrier billing system 120A or the provisioning request device 103, a response including an acknowledgement indicating the success of the adding service to carrier A at the IAM system 111.

Figure 3:
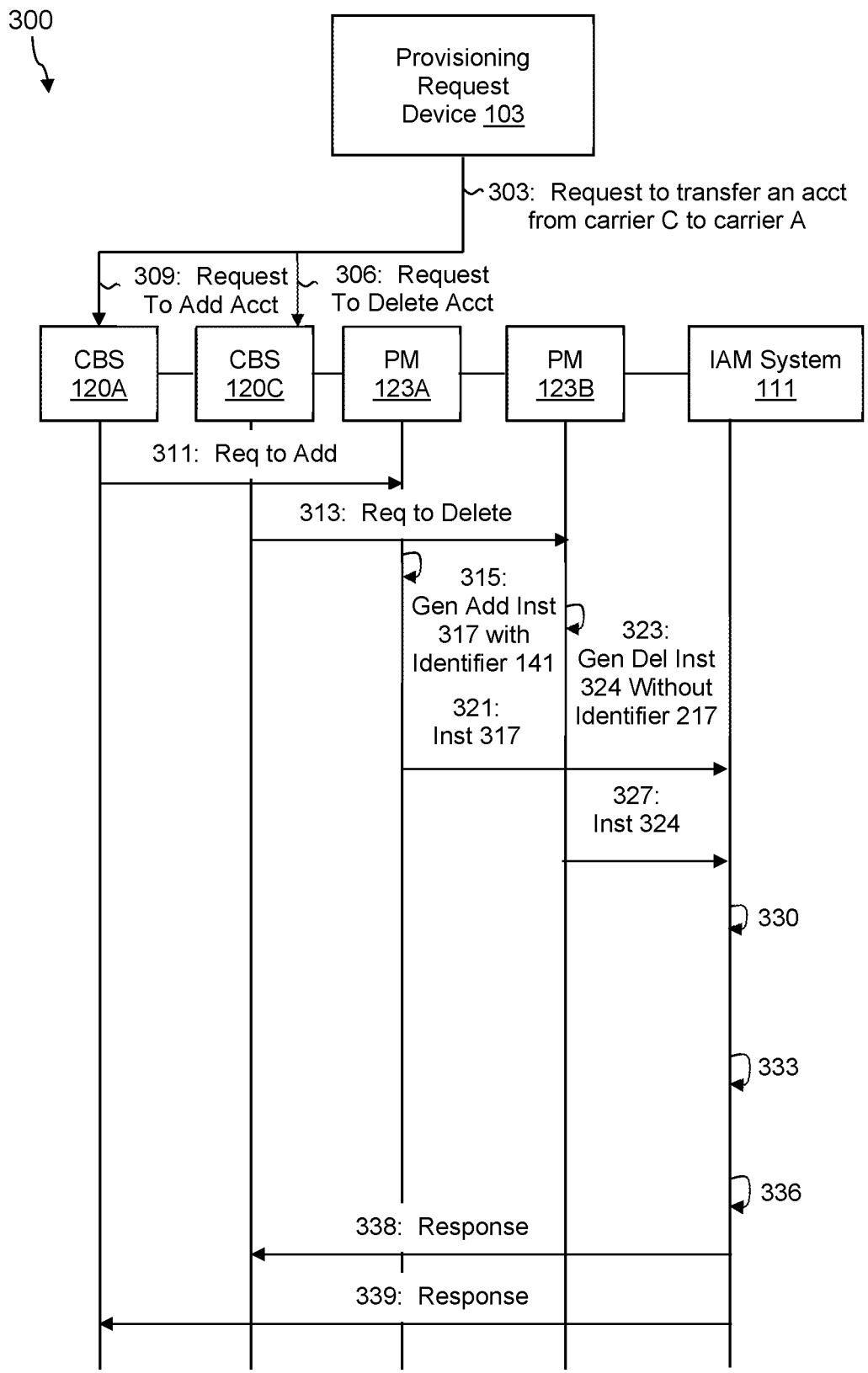
FIG. 3 is a message sequence diagram of another example method performed by the communication system of FIG. 1 according to an embodiment of the disclosure.

Turning now to FIG. 3, shown is a message sequence diagram 300 illustrating a method implemented by the system of FIG. 1. Message sequence diagram 300 shows examples of messages sent between the provisioning request device 103, carrier billing systems 120A and 120C, provisioning middleware 123A and 123B, and IAM system 111 according to various embodiments of the disclosure. Message sequence diagram 300 is similar to the message sequence diagrams 250 and 270, except that message sequence diagram 300 is implemented by the carrier billing system 120C instead of carrier billing system 120B, and that the message sequence diagram 300 further includes messages transmitted to and from the provisioning middleware 123B. Since the carrier billing system 120C is sending messages in message sequence diagram 300, the provisioning middleware 123B associated with the carrier billing system 120C may also be included in the method as an intermediary entity used to forward messages to and from the carrier billing system 120C.

Steps 303, 306, and 309 of message sequence diagram 300 are similar to steps 203, 206, and 209 of message sequence diagram 250 and 270 of FIGS. 2A-B, respectively. However, unlike message sequence diagram 250 and 270, the provisioning request device 103 transmits a request to transfer a device identified by line identifier 139 from carrier C associated with the carrier billing system 120C to carrier A associated with the carrier billing system 120A. In addition, at step 309, the request to delete the existing account is sent to the carrier billing system 120C.

At step 311, the carrier billing system 120A may forward the request to add the new account to the provisioning middleware 123A associated with the carrier billing system 120A. Step 313 may be similar to step 251 of the message sequence diagram 250.

At step 313, the carrier billing system 120C may forward the request to delete the existing account from carrier C to the provisioning middleware 123C associated with the carrier billing system 120C. Step 313 may be similar to step 261 of the message sequence diagram 250.

At step 315, the provisioning middleware 123A may generate an add instruction 317, which may be similar to the add instruction 216 described above. The add instruction 317 may include a source identifier 141 identifying the carrier billing system 120A. In an embodiment, the add instruction 317 may include an identifier or address of the provisioning middleware 123A. At step 321, the provisioning middleware 123A may transmit the add instruction 317 to the IAM system 111 via link 151. In an embodiment, the add instruction 317 may include an identifier or address of the provisioning middleware 123B.

At step 323, the provisioning middleware 123B may generate a delete instruction 324, which may be similar to the delete instruction 223 described above, except that the delete instruction may not include the source identifier 141 identifying the carrier billing system 120C. In some embodiments, the carrier billing systems 120A-C or the provisioning middlewares 123A-B may determine the source identifier 141 identifying the carrier billing system 120A-C, and either the carrier billing systems 120A-C or the provisioning middlewares 123A-B may add the source identifier 141 to an instruction 223. In other embodiments, the IAM system 111 may determine the source identifier 141 from certain data, or authentication (e.g., the username of the API request). At step 327, the provisioning middleware 123B may transmit the delete instruction 324 to the IAM system 111 via link 151.

In this case, the provisioning middleware 123B may not need to add the source identifier 141 to the delete instruction 324 because the provisioning middleware 123B is only attached to one carrier billing system 120C, which may be indicated in the locally stored mappings 142. As mentioned above, the mappings 142 include a list of associations between source identifiers 141 of carrier billing systems 120A-C and the identifiers or address of the attached provisioning middlewares 123A-B.

In this embodiment, when the IAM system 111 receives the delete instruction 324, the provisioning application 145 may perform a look-up at the mappings 142 using the address or identifier of the provisioning middleware 123B received in the delete instruction 324, at step 330. Based on the look-up, the provisioning application 145 may determine the source identifier 141 corresponding to the address or identifier of the provisioning middleware 123B.

At step 333, the provisioning application 145 at the IAM system 111 adds the new account to the subscriber database 130, using the techniques described above with reference to message sequence diagrams 250 and 270. At step 336, the provisioning application 145 may delete an existing account linked to the line identifier 139, based on the source identifier 141 determined at step 330. In this case, the add instruction 317 may succeed because the source identifier 141 in the add instruction 317 does not match the source identifier 141 stored in the subscriber database 130 in association with the line identifier 139, and because the add instruction 317 is an instruction to add data to the IAM system 111. In this case, the provisioning middleware 123B prioritizes the add instruction 317, and may drop the delete instruction 324.

At step 338, the IAM system 111 may transmit a response to the carrier billing system 120C or the provisioning request device 103 indicating whether the request at step 306 (i.e., the delete instruction 324) was successful or not. At step 339, the IAM system 111 may transmit a response to the carrier billing system 120A or the provisioning request device 103 indicating whether the request at step 309 (i.e., the add instruction 317) was successful or not, in a manner to prevent re-attempting transmission of the request.

Figure 4:
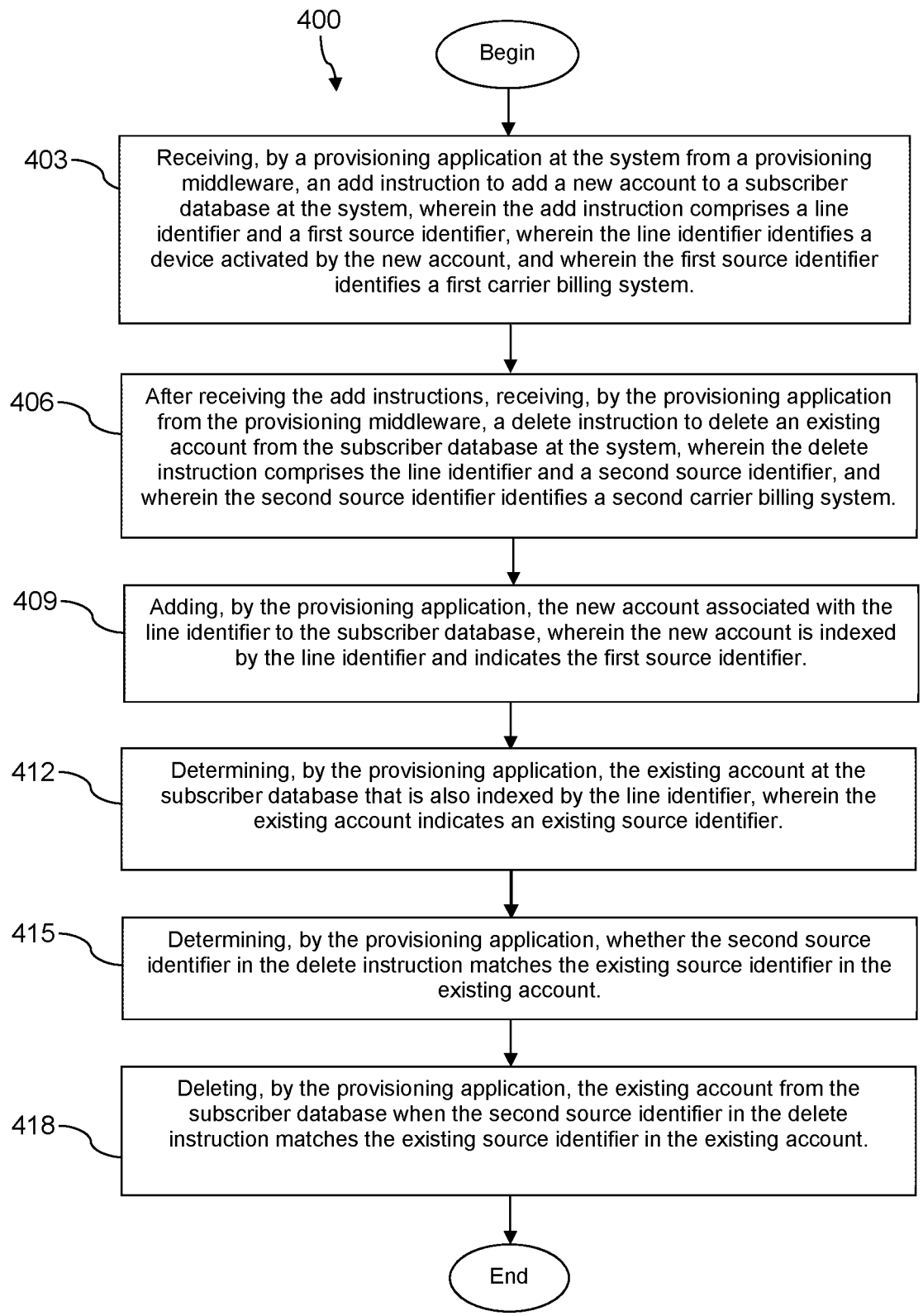
FIG. 4 is a flow chart of a first method performed by an IAM system in the communications system of FIG. 1 according to an embodiment of the disclosure.

Turning now to FIG. 4, a method 400 is described. Method 400 may be performed by the provisioning application 145 at the IAM system 111 after the provisioning application 145 receives the add instruction 216 and delete instruction 223. At block 403, method 400 comprises receiving, by a provisioning application 145 at the IAM system 111 from a provisioning middleware 123A, an add instruction 216 to add a new account to a subscriber database 130 at the IAM system 111. In an embodiment, the add instruction 216 comprises a line identifier 139 and a first source identifier 141. The line identifier 139 may identify a device activated by the new account or a new line to an existing account. The first source identifier 141 may identify a first carrier billing system 120A from which the provisioning middleware 123A received a request to add the new account.

After receiving the add instruction 216, at block 406, method 400 comprises receiving, by the provisioning application 145 from the provisioning middleware 123A, a delete instruction 223 to delete the existing account, or an existing line, from the subscriber database 130 at the IAM system 111. In an embodiment, the delete instruction 223 comprises the line identifier 139 and a second source identifier 141. The second source identifier 141 may identify a second carrier billing system 120B from which the provisioning middleware 123A received a request to delete the existing account.

At block 409, method 400 comprises adding, by the provisioning application 145, the new account associated with the line identifier 139 at the subscriber database 130 with the first source identifier 141, such that the new account is indexed by the line identifier 139. At block 412, method 400 comprises determining, by the provisioning application 145, the existing account at the subscriber database 130 that is also indexed by the line identifier 139. The existing account may indicate an existing source identifier 141. At block 415, method 400 comprises determining, by the provisioning application 145, whether the second source identifier 141 in the delete instruction 223 matches the existing source identifier 141 in the existing account. At block 418, method 400 comprises deleting, by the provisioning application 145, the existing account from the subscriber database 130 when the second source identifier 141 in the delete instruction 116 matches the existing source identifier 141 in the existing account.

Figure 5:
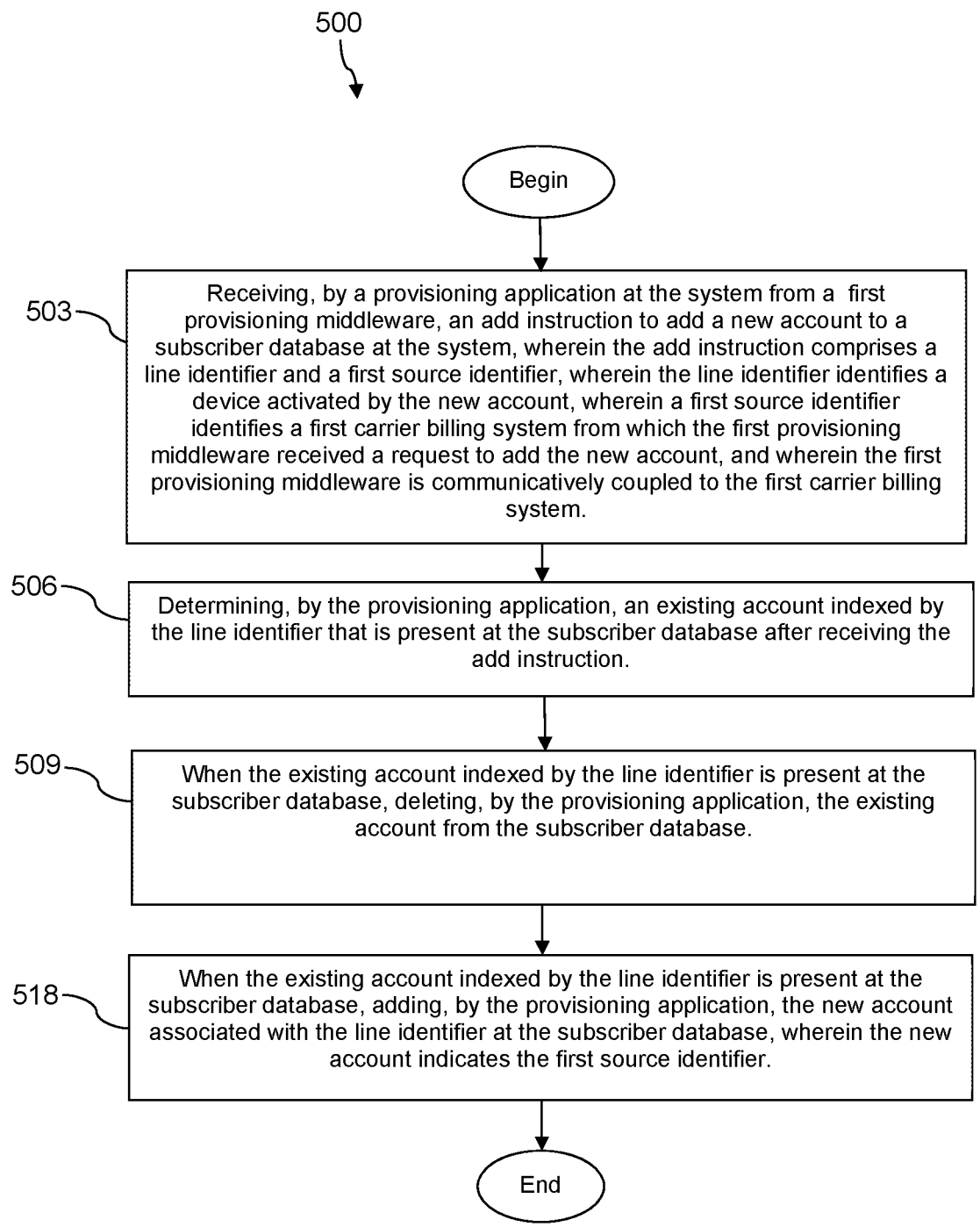
FIG. 5 is a flow chart of a second method performed by an IAM system in the communications system of FIG. 1 according to an embodiment of the disclosure.

Turning now to FIG. 5, a method 500 is described. Method 500 may be performed by the provisioning application 145 at the IAM system 111 after the provisioning application receives the add instruction 216 or 317. At block 503, method 500 comprises receiving, by a provisioning application 145 at the IAM system 111 from a first provisioning middleware 123A, an add instruction 216 or 317 to add a new account to a subscriber database 130 at the IAM system 111. In an embodiment, the add instruction 216 or 317 comprises a line identifier 139 and a first source identifier 141. The line identifier 139 may identify a line activated by the new account. The first source identifier 141 may identify a first carrier billing system 120A from which the first provisioning middleware 123A received a request to add the new account. The first provisioning middleware 123A may be communicatively coupled to the first carrier billing system 120A.

At block 506, method 500 comprises determining, by the provisioning application 145, an existing account indexed by the line identifier 139 that is present at the subscriber database 130, after receiving the add instruction 216 or 317. When the existing account indexed by the line identifier is present at the subscriber database 130, method 500 proceeds to blocks 509 and 518. At block 509, method 500 comprises deleting, by the provisioning application 145, the existing account from the subscriber database 130. The existing account may be deleted from the subscriber database 130, without receiving any delete instructions 223 or 324. At block 518, method 500 comprises adding, by the provisioning application 145, the new account associated with the line identifier 139 at the subscriber database 130 with the first source identifier 141, such that the new account is indexed by the line identifier 139.

In an embodiment, subsequent to deleting the existing account from the subscriber database 130, method 500 may comprise receiving, by the provisioning application 145, a delete instruction 223 or 324 to delete the existing account from the subscriber database 130. The delete instruction 223 or 324 may indicate the line identifier 139. In an embodiment, the second carrier billing system 120 may be the only billing system coupled to the second provisioning middleware 123B. After receiving the delete instruction 223 or 324, method 500 may comprise determining, by the provisioning application 145, a second source identifier 141 identifying the second carrier billing system 120C from which the second provisioning middleware 123B received the request to delete the existing account. In an embodiment, the provisioning application 145 may determine that the existing account stored in association with the second source identifier 141 has already been deleted. In another embodiment, the provisioning application 145 may determine that the second source identifier 141 in the delete instruction 223 or 324 does not match the first source identifier 141 stored in association with the newly added account, indexed by the line identifier 139. In either case, the provisioning application 145 may ignore or discard the delete instruction 223 or 324, and transmit, via an API 148, a response to the provisioning request device 103 indicating a success of deleting the existing account.

Figure 6A:
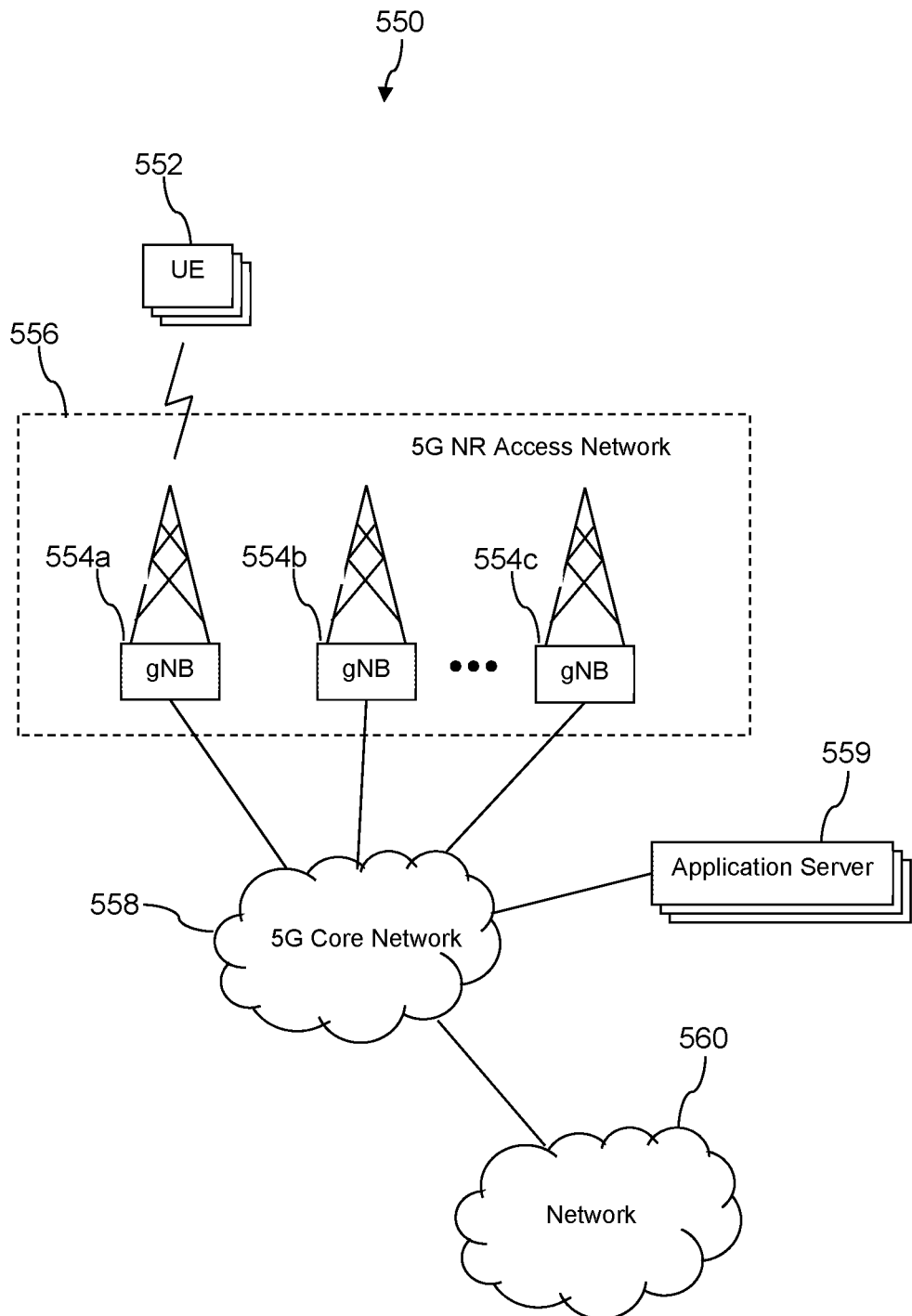
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the carrier hotspot device 105, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
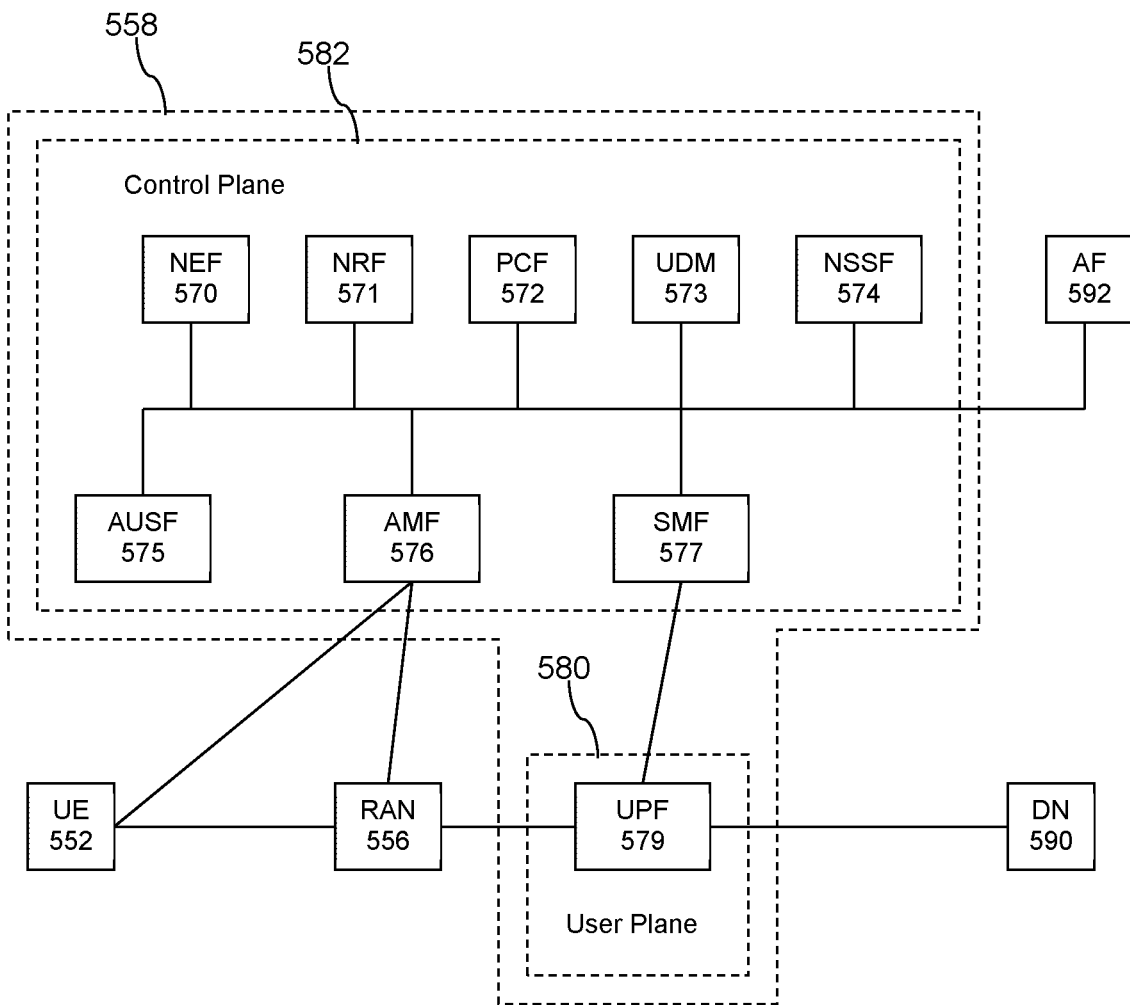

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
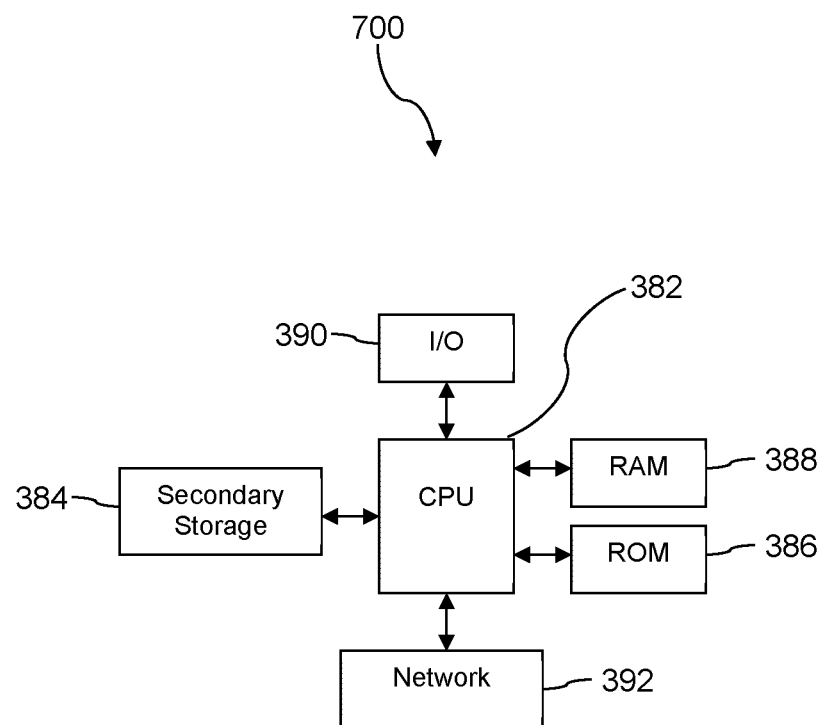
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, provisioning request device 103, IAM system 111, provisioning application 145, provisioning middlewares 123A-B and/or carrier billing systems 120A-B may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a system comprising consolidated subscriber data in communication with a plurality of provisioning middlewares to provision transactions asynchronously, wherein the method comprises:
   receiving, by a provisioning application at the system from a first provisioning middleware, an add instruction to add a new account to a subscriber database at the system, wherein the add instruction indicates a line identifier and a first source identifier, wherein the line identifier identifies a line activated by the new account, wherein the first source identifier identifies a first carrier billing system from which the first provisioning middleware received a request to add the new account, and wherein the first provisioning middleware is communicatively coupled to the first carrier billing system;
   determining, by the provisioning application, an existing account indexed by the line identifier that is present at the subscriber database after receiving the add instruction;
   when the existing account indexed by the line identifier is present at the subscriber database:
      deleting, by the provisioning application, the existing account from the subscriber database; and
      adding, by the provisioning application, the new account associated with the line identifier at the subscriber database, wherein the new account indicates the first source identifier, and wherein the first source identifier stored with the line identifier at the subscriber database is used to determine whether to perform or discard a received delete or update instruction;
   receiving, by the provisioning application from a second provisioning middleware, a delete instruction to delete the existing account from the subscriber database at the system, wherein the delete instruction indicates the line identifier, and wherein a second carrier billing system is the only billing system coupled to the second provisioning middleware;
   determining, by the provisioning application, from a memory, a second source identifier identifying the second carrier billing system from which the second provisioning middleware received a request to delete the existing account;
   determining, by the provisioning application, whether the second source identifier in the delete instruction matches the first source identifier stored in association with the new account that has been recently added to the subscriber database;
   discarding the delete instruction when the second source identifier in the delete instruction does not match the first source identifier stored in association with the new account; and
   transmitting, via an application programming interface, a response to a provisioning request device indicating a success of deleting the existing account.

2. The method of claim 1, wherein the line identifier is either a Mobile Subscriber Integrated Services Digital Network (MSISDN) number uniquely identifying a subscription of the device, or an International Mobile Subscriber Identity (IMSI).

3. The method of claim 1, further comprising:
   determining, by the provisioning application, that the existing account stored in association with the second source identifier has already been deleted; and
   transmitting, via an application programming interface, a response to a provisioning request device indicating a success of deleting the existing account.

4. The method of claim 1, wherein deleting the existing account from the subscriber database comprises deleting a contract between a subscriber and a carrier from the subscriber database, and wherein the contract is associated with the line identifier.

5. A method performed by a system to provision transactions asynchronously, wherein the method comprises:
   receiving, by a provisioning application at the system from a provisioning middleware, an add instruction to add a new account to a subscriber database at the system, wherein the add instruction comprises a line identifier and a first source identifier, wherein the line identifier identifies a line activated by the new account, and wherein the first source identifier identifies a first carrier billing system from which the provisioning middleware received a request to add the new account;
   after receiving the add instruction to add a new account to a subscriber database, receiving, by the provisioning application from the provisioning middleware, a delete instruction to delete an existing account from the subscriber database at the system, wherein the delete instruction comprises the line identifier and a second source identifier, and wherein the second source identifier identifies a second carrier billing system from which the provisioning middleware received a request to delete the existing account;
   adding, by the provisioning application, the new account associated with the line identifier to the subscriber database, wherein the new account is indexed by the line identifier and indicates the first source identifier;
   determining, by the provisioning application, the existing account at the subscriber database that is also indexed by the line identifier, wherein the existing account indicates an existing source identifier;
   determining, by the provisioning application, whether the second source identifier in the delete instruction matches the existing source identifier in the existing account; and
   deleting, by the provisioning application, the existing account from the subscriber database when the second source identifier in the delete instruction matches the existing source identifier in the existing account.

6. The method of claim 5, further comprising transmitting, via an application programming interface, a response to a provisioning request device indicating a success of adding the new account or deleting the existing account.

7. The method of claim 5, further comprising maintaining a plurality of subscriber accounts at the subscriber database, wherein each subscriber account comprises one or more line identifiers and one or more contracts with a carrier for each of the line identifiers.

8. The method of claim 5, wherein adding the new account comprises:
adding the new account as a new subscriber account in the subscriber database; or
adding a new line in an existing subscriber account in the subscriber database, wherein the new line is indexed by the line identifier.

9. The method of claim 5, wherein adding the new account to the subscriber database comprises adding a contract between a subscriber and a carrier to the subscriber database, and wherein the contract is associated with the line identifier.

10. The method of claim 5, wherein deleting the existing account from the subscriber database comprises:
deleting a subscriber account including the existing account from the subscriber database; or
deleting a line in an existing subscriber account in the subscriber database, wherein the line is indexed by the line identifier.

11. The method of claim 5, wherein deleting the existing account from the subscriber database comprises deleting a contract between a subscriber and a carrier from the subscriber database, and wherein the contract is associated with the line identifier.

12. A system comprising:
at least one processor;
at least one non-transitory memory;
one or more provisioning middlewares communicatively coupled to a first carrier billing system and a second carrier billing system, wherein the one or more provisioning middlewares are configured to:
transmit, to a system, an add instruction to add a new account to a subscriber database at the system, wherein the add instruction indicates a line identifier and a first source identifier, wherein the line identifier identifies a line activated by the new account, and wherein a first source identifier identifies a first carrier billing system; and
transmit, to an system, a delete instruction to delete an existing account from the subscriber database at the system, wherein the delete instruction indicates the line identifier and a second source identifier, and wherein the second source identifier identifies a second carrier billing system; and
a provisioning application of the system, stored in the at least one non-transitory memory, which when executed by the at least one processor, causes the at least one processor to be configured to:
receive the add request;
receive the delete request after the add request is received;
add the new account associated with the line identifier at the subscriber database with the first source identifier such that the new account is indexed by the line identifier;
determine the existing account at the subscriber database that is also indexed by the line identifier, wherein the existing account indicates an existing source identifier;
determine whether the second source identifier in the delete instruction matches the existing source identifier in the existing account; and
delete the existing account from the subscriber database when the second source identifier in the delete instruction matches the existing source identifier in the existing account.

13. The system of claim 12, wherein the provisioning application further causes the at least one processor to be configured to transmit, via an application programming interface, a response to a provisioning request device indicating a success of adding the new account or deleting the existing account.

14. The system of claim 12, wherein the provisioning application further causes the at least one processor to be configured to maintain a plurality of subscriber accounts at the subscriber database, and wherein each subscriber account comprises one or more line identifiers and one or more contracts with a carrier for each of the line identifiers.

15. The system of claim 12, wherein the line identifier is either a Mobile Subscriber Integrated Services Digital Network (MSISDN) number uniquely identifying a subscription of the device, or an International Mobile Subscriber Identity (IMSI).

16. The system of claim 12, wherein the one or more provisioning middlewares are configured to receive a request to add the new account and delete the existing account from a provisioning request device.

17. The system of claim 12, wherein the one or more provisioning middlewares receive the first source identifier in a request to add the new account received from the first carrier billing system.

18. The system of claim 12, wherein the one or more provisioning middlewares receive the second source identifier in a request to delete the existing account received from the second carrier billing system.

* * * * *